United States Patent [19]
Abrams

[11] Patent Number: 5,908,527
[45] Date of Patent: *Jun. 1, 1999

[54] METHOD OF DOUBLE-SIDED PRINTING OF A LAMINATE AND PRODUCT OBTAINED THEREBY

[75] Inventor: Richard W. Abrams, Jacksonville, Fla.

[73] Assignee: Johnson & Johnson Vision Products, Inc., Jacksonville, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/464,460

[22] Filed: Jun. 5, 1995

Related U.S. Application Data

[62] Division of application No. 08/106,386, Aug. 13, 1993.

[51] Int. Cl.$^6$ ................................................. B65D 37/00
[52] U.S. Cl. ........................ 156/277; 428/200; 428/203; 428/209; 428/423.1; 428/425.8; 428/424.2; 428/424.8; 428/423.7; 428/457; 428/458; 428/910; 428/913.5
[58] Field of Search ........................ 156/277; 428/200, 428/203, 209, 423.1, 425.8, 424.2, 424.8, 423.7, 457, 458, 910, 913.5

[56] References Cited

U.S. PATENT DOCUMENTS

| | | | |
|---|---|---|---|
| 4,389,438 | 6/1983 | Ohtsuki et al. | 156/277 |
| 4,581,278 | 4/1986 | Margerum et al. | 428/200 |
| 5,438,348 | 8/1995 | Imani et al. | 156/234 |
| 5,518,762 | 5/1996 | Soltysiak | 156/277 |

FOREIGN PATENT DOCUMENTS

| | | | |
|---|---|---|---|
| 2738372 | 8/1977 | Germany | 156/277 |

OTHER PUBLICATIONS

Translation of DE (I) 2738372 Aug. 25, 1977.

*Primary Examiner*—Patrick Ryan
*Assistant Examiner*—M. Alexandra Elve

[57] ABSTRACT

A method of double-sided printing, in effect, on opposite or both surfaces of a layer on a multi-layered foil laminate. Moreover, also disclosed is the provision of a novel multi-layered foil laminate having at least one layer, preferably an exterior layer which is constituted of a plastic film material, and which is provided with printing on both surfaces of the layer. In essence, the inventive method of double-sided printing includes initially printing on a first side of an outer layer of a plastic film material, preferably such as polyester, wherein the printing is imparted to the side or surface of the plastic film material facing towards an underlying metallic foil to which it is to be adhered. Thereafter, in order to effectuate the printing on the opposite or external surface of the outer plastic film material, the laminated foil has thermal transfer printing imparted to the outer surface of the plastic film layer, preferably through the intermediary of a ceramic printing head, imparting further indicia indicative of specific information relative to the contents of a package which is to be equipped with the foil laminate.

16 Claims, 3 Drawing Sheets

METHOD OF DOUBLE-SIDED PRINTING OF A LAMINATE AND PRODUCT OBTAINED THEREBY

This is a divisional of copending application Ser. No. 08/106,386, filed on Aug. 13, 1993.

BACKGROUND OF THE INVENTION

1. Field of the Invention

The present invention relates to a method of double-sided printing, in effect, on opposite or both surfaces of a layer on a multi-layered foil laminate. Moreover, the invention is also directed to the provision of a novel multi-layered foil laminate having at least one layer, preferably an exterior layer which is constituted of a plastic film material, and which is provided with printing on both surfaces of the layer.

The utilization of foil laminates which possess an external surface which is imprinted with various legends and indicia, and whereby the foil laminate may be utilized, among numerous other physical applications, as lid stock for plastic packages, such as the so-called "blister packages" of the injection molded type, is well-known in the packaging technology.

2. Discussion of the Prior Art

In many instances, the externally arranged layer of the lid or cover-forming foil laminate; in essence, the layer having a surface facing the outside of the package, may be provided with suitable printing. For example, such printing may consist of indicia or legends identifying the manufacturer, the manufacturer's logo and miscellaneous information and decorative and advertising indicia identifying the product in the package, and include suitable variable technical information, such as expiration dates, lot numbers and other data specific to the packaged product.

Basically, such multi-layered foil laminates in the form of webs which are employed for lid stock purposes include outer layers of suitable plastic film material adhesively fastened to both sides or opposite surfaces of a foil web. Such a foil web is ordinarily constituted of a suitable metallic material, which may be aluminum or the like, and wherein one of the plastic film material layers is adapted to be adhesively secured, such as by means of heat sealing or the like, to the injection- molded material of the plastic container or package whose contents it is adapted to seal therein. Frequently, blister packages or similar plastic containers which have covers in the shape of foil laminates applied thereto are subjected to potentially damaging temperature and/or environmental conditions. This may be the case when the entire package is subjected to sterilization, as in the instance when the product housed therein is intended to be employed in a medical capacity; for example, a product such as a contact lens which is adapted to be packed in a sterile saline solution and sealed in a compartment or cavity of the package.

It is essential to be able to ensure that the printing which is normally provided on the exterior of the package will safely withstand these above-mentioned conditions without either being completely obliterated or even only rendered partially illegible. Consequently, it is an important aspect that suitable kinds of printing be employed which will not only remain stable under such adverse physical conditions, but which will also avoid any deleterious effects to be imparted thereto. Thus, for instance, when the outer plastic film material layer at one side of the laminate is constituted so as to possess a printable and generally transparent nature; for instance, such as a polyester film. Currently employed types of printing are not sufficiently adequate to meet the stringent demands of industry. Thus, the utilization of laser printing does not always provide for a satisfactory printing result, while hot stamp printing produces impressions in the laminate which may adversely affect the mechanical sealing properties thereof with regard to the underlying surface portions of the package or container to which the laminate is to be heat sealed or bonded.

SUMMARY OF THE INVENTION

Accordingly, the present invention provides for a novel and inventive method of implementing so-called double-sided printing or, in effect, printing on both surfaces of an outer layer of a foil laminate. In essence, the inventive method of double-sided printing includes initially printing on a first side of an outer layer of a plastic film material, preferably such as polyester, wherein the printing is imparted to the side or surface of the plastic film material facing towards an underlying metallic foil to which it is to be adhered, and wherein the printing is applied to the plastic film material through the intermediary of either reverse or other suitable halftone color printing. Subsequent to this printing on the one side of the outer plastic film layer having been completed, the plastic film material is adhesively secured or bonded at the printed surface thereof to the underlying metallic foil, such as through the interposition of a suitable adhesive.

Thereafter, in order to effectuate the printing on the opposite or external surface of the outer plastic film material, the web of the previously laminated foil structure is adapted to be advanced to a suitable printing arrangement. This printing arrangement causes thermal transfer printing to be applied to the exterior surface of this outer plastic film layer of the laminate at predetermined locales, preferably through the intermediary of a ceramic printing head, printing further indicia which are specifically indicative of information relative to the particular contents of a package which is to be equipped with the foil laminate. The method of application of the printing provides for an efficient mode of imprinting in a double-sided manner both surfaces of the outer plastic film material, the latter of which may be preferably constituted from but not limited to polyester, the properties of which are well suited to thermal transfer printing in view of the porous nature of polyester. This type of thermal transfer printing will not form any impressions in the foil laminate while being adapted to withstand high temperatures and other adverse environmental conditions for considerable periods of time without any deteriorating effects being encountered by the printing on the outside of the laminate.

The foil laminate, which is initially provided as a continuous sheet or web from a suitable supply roll or the like, may also have the opposite surfaces of the metallic foil provided with a suitable adhesive so as to adhesively contact and be bonded to a further plastic film material, with such film material being preferably constituted from a polypropylene. The latter, in turn, is adapted to be bonded to contiguous sealing surfaces on an injection-molded shaped plastic container or package, which may be constituted of polypropylene, such as by means of heat sealing or the like, so as to form a complete packaging structure as is well known in the packaging technology. A "blister package" of this type is disclosed, for example, in U.S. Pat. No. 4,691,820, commonly assigned to the assignee of this application.

In order to facilitate the accurate and precisely located printing on the outer surface of the plastic film material through the intermediary of the thermal transfer printing, means are provided to enable a precise registry with the underlying printing on the opposite surface of the plastic film material. The printing which is provided on the inwardly facing or opposite surface of the first-mentioned plastic film material, and which is located within the laminate adhered to the foil web may incorporate suitable print fields which formulate guides for printing registration upon being scanned by a suitable optical sensor located proximate the exterior of the foil laminate. This will ensure that the thermal transfer printing is correctly positioned within the scanned print fields over which the thermal transfer printing has been delegated such that, upon a subsequent severing of the web constituted of the foil laminate into predetermined segments forming lid portions for containers or blister packages, the printed information provided thereon with regard to the product will always be correctly located on the finished package.

Furthermore, the invention is also directed to the provision of a multi-layered foil laminate including an outer plastic film material layer, which is printed on both surfaces thereof in a manner so as to provide on one side of the plastic film layer facing the underlying foil material, permanent colored indicia and legends. To the contrary, the printing which is subsequently imparted on the outer surface of the plastic film material layer of the laminate, and which is applied thereto through the intermediary of thermal transfer printing, is positioned in precise registry with the underlying printing previously imparted to the opposite or inwardly facing surface of the outer layer.

Accordingly, it is an object of the present invention to provide a novel and inventive method of double-sided printing or; in essence, printing on opposite surfaces of a layer of a multi-layered foil laminate.

It is a more specific object of the present invention to provide a method of printing as described herein, in which the double-sided printing is implemented in that initially one side of the outer, plastic film material, which may be transparent or translucent, facing an underlying metallic foil and adapted to be adhesively secured or bonded thereto is suitably printed in color halftones to provide permanent indicia and coloring background subsequent to lamination of the plastic and metallic layers. The external or opposite surface of the plastic film layer is subsequently imprinted through the intermediary of thermal transfer printing in predetermined registration with the underlying printing on the opposite surface of the plastic film layer.

Yet another object of the present invention is to provide a multi-layered foil laminate having at least one outer layer thereof provided with printing on both sides thereof utilizing the printing method pursuant to the invention.

BRIEF DESCRIPTION OF THE DRAWINGS

Reference may now be had to the following detailed description of an embodiment of the invention, taken in conjunction with the accompanying drawings; in which.

DETAILED DESCRIPTION OF A PREFERRED EMBODIMENT

Figure 1:
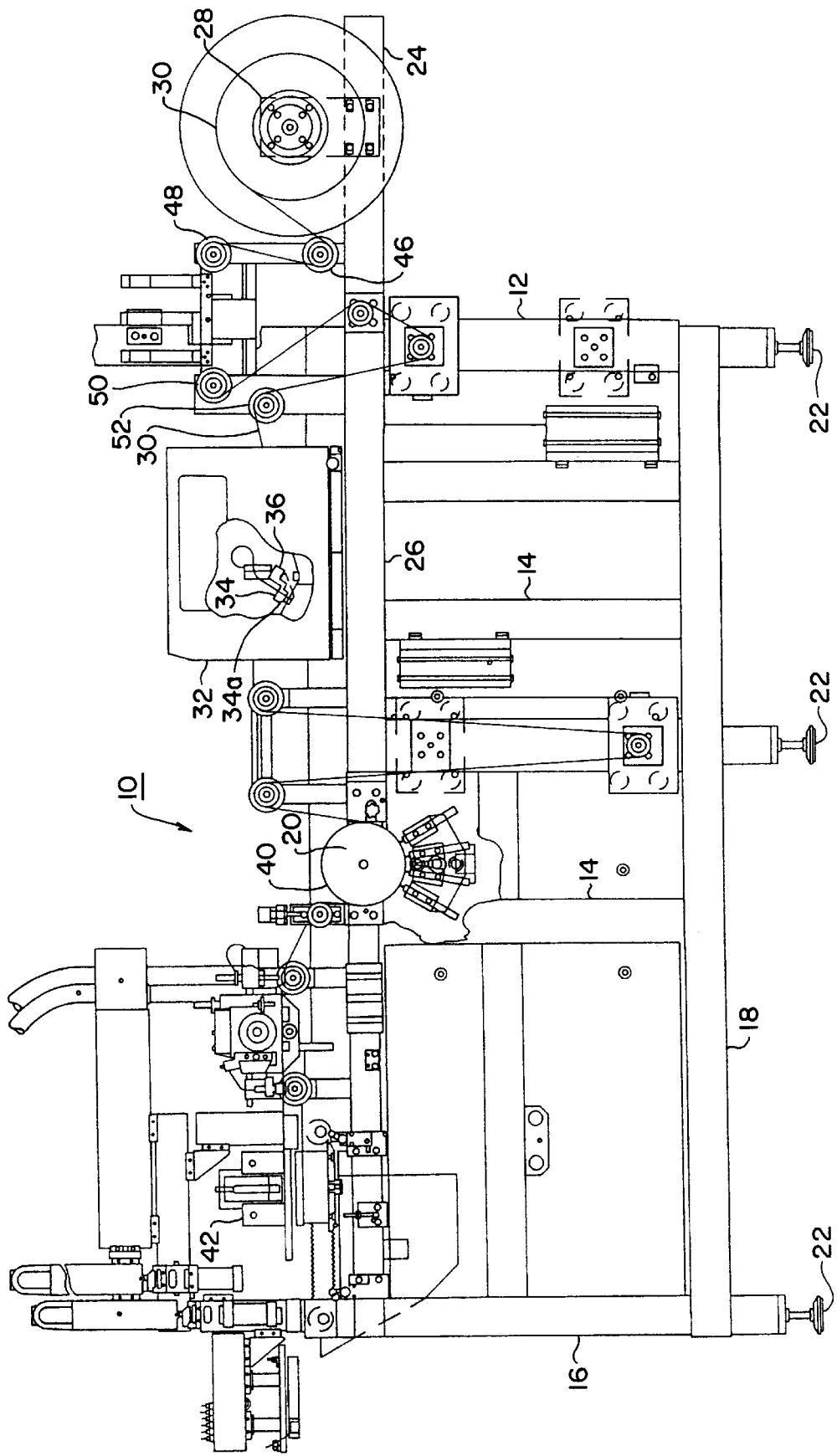
FIG. 1 illustrates an elevational side view of an apparatus for implementing the double-sided printing of a layer of a foil laminate, including various workstations for forming a plurality of lid closures for packages from a web of the imprinted foil laminate.
Figure 2:
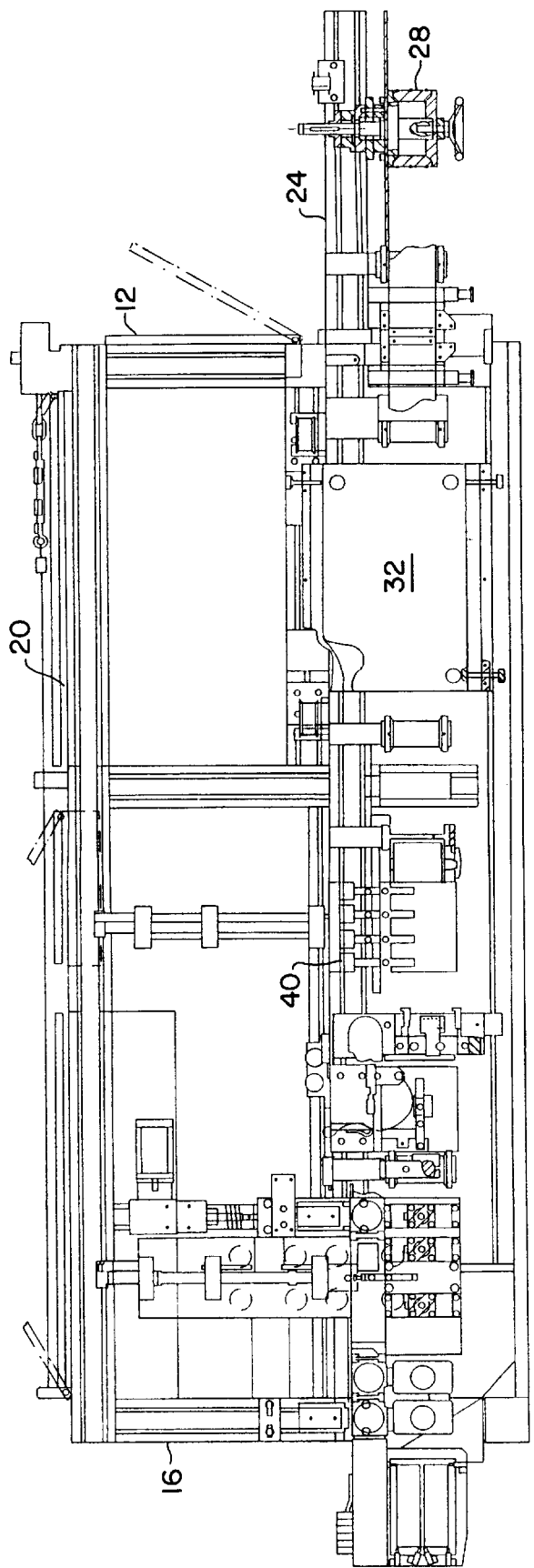
FIG. 2 illustrates a top plan view of the apparatus of FIG. 1.
Figure 3:
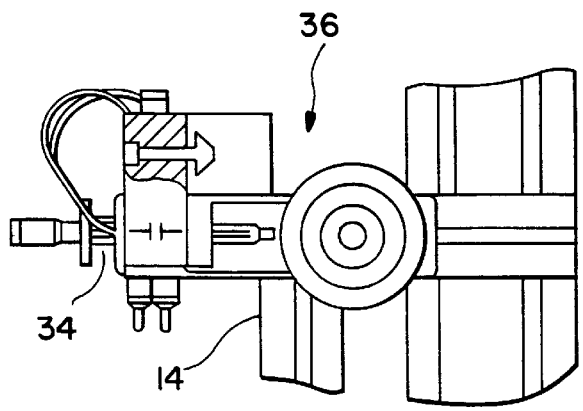
FIG. 3 illustrates, on an enlarged scale, a sensor arrangement utilized in conjunction with the operation of a printing head for implementing the double-sided printing of the foil laminate.

Referring now in detail to the drawings, and specifically to FIGS. 1 and 2, there is disclosed an apparatus 10 for the processing of a continuous web consisting of a multi-layered foil laminate into a plurality of lid or closure structures for plastic containers of the so-called "blister package" type. These containers may be shaped injection-molded plastic structures of generally rigid or semi-rigid configurations, normally incorporating product-receiving cavities or compartments, and flange surfaces to which the lids constituted from portions of the laminate are adapted to be secured or bonded, such as by heat sealing or the like. The apparatus 10 generally includes a plurality of upright frame members 12, 14 and 16 rigidly interconnected with horizontal support beams 18 and 20 so as to constitute a fixed and stationary support framework adapted to be mounted on legs 22 resting on a suitable floor surface.

On a cantilevered extension 24 of a horizontal beam 26, there is journaled a rotatable structure 28 supporting a roll formed from a continuous web of a multi-layered foil laminate 30, as described in detail hereinbelow with regard to FIGS. 4 and 5 of the drawings.

Arranged along the longitudinal path of transport of the foil laminate 30 along the framework is a housing 32 supporting therein a printing head arrangement 34 and an optical sensor unit 36.

Furthermore, arranged along the horizontal extent of the framework in the direction downstream of the printing head arrangement 34 is a suitable slitting unit 40 and various operative devices 42 for severing the web of foil laminate 30 into suitable lids or covers for containers or packages. These particular workstations and operative components are described in further extensive detail in various copending patent applications with regard to the formation of the covers or lids from the foil laminate 30, and consequently are not described in more specific detail herein.

The foil laminate web 30 is unwound by being drawn by a suitable driving device (not shown) from its rotatable support 28, and guided over a plurality of guide and tension roller units 46 through 48, 50 and 52 towards closely and below the printing head arrangement 34 along the horizontal extent of the apparatus 10.

Figure 4:
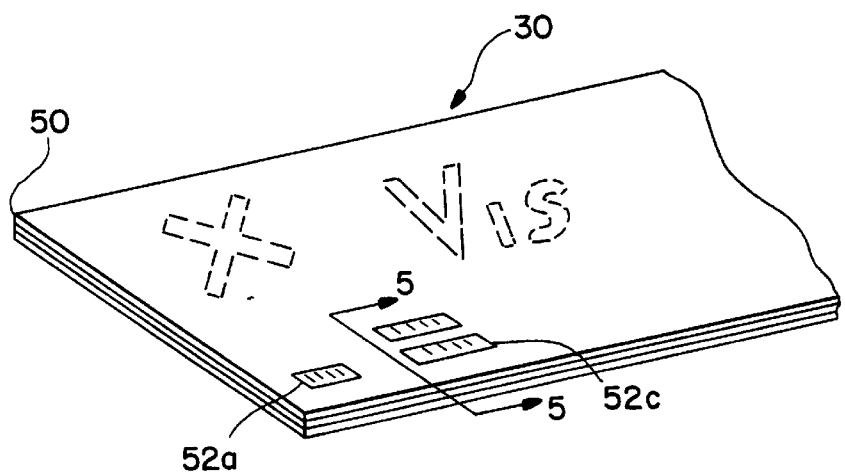
FIG. 4 illustrates a fragmentary portion of the foil laminate web which is adapted for the double-sided printing thereof.
Figure 5:
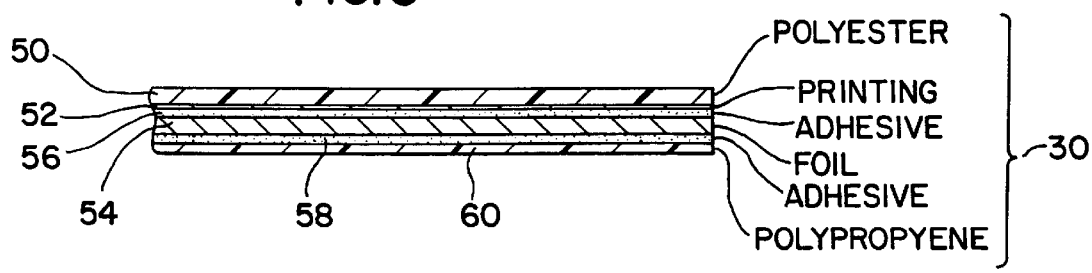
FIG. 5 illustrates, on an enlarged scale, a sectional view through the foil laminate taken along line 5—5 in FIG. 4.

The multi-layered foil laminate 30 is constituted of a plurality of layers of various materials which are adhesively secured or bonded to each other, as shown in detail in FIGS. 4 and 5 of the drawings.

Reverting to FIG. 5, the multi-layered foil laminate 30 includes an upper layer 50 constituted of a substantially transparent or translucent polyester film material which has been previously imprinted via conventional lithography on its lower surface 52 with suitable indicia which may be in solid or colored halftones, including reversely printed legends as required, and which may also include a further color or print layer therebeneath forming a colorated or contrasting background, for instance, such as white or any other suitable color. Inasmuch as the indicia of halftones and the background beneath the polyester film web 50 are printed on interior surface 52, upon viewing from the outside towards the outer surface of the polyester film web 50, as shown in FIG. 4 of the drawings, in view of the transparency of the polyester film, the various indicia and legends which may be representative of the company name, logo, various decorative and advertising matters and printed information which is to be permanently provided for products of this type in general. While conventional lithography is used in the preferred embodiment, it should be noted that other forms of printing processes could be utilized. Suitable print fields 52a, 52b and 52c may be clearly ascertained and viewed from the exterior of the film layer 50. A foil web 54 consisting preferably of aluminum extends adjacent the lower surface 52 of the polyester film and is adhesively secured or bonded thereto through the interposition of an adhesive layer constituted of a dry bonding adhesive 56, which may be polyurethane.

The other side or surface of the aluminum foil web 54 may also be coated with a further adhesive layer 58 similar to that of adhesive layer 56, and which is also constituted of polyurethane. This adhesive is intended to provide an adhesive connection or bond between the lower surface of the aluminum foil web 54 and a further plastic film layer 60 which may be constituted of polypropylene, and which provides for a good sealing adherence to the plastic material of an injection-molded plastic package or container; for instance, through heat sealing thereto or the like. Suitable plastic films other than polyester and which are substantially transparent, which may be imprinted on both sides thereof may include, among others, low and medium density polyethylenes, EVA copolymers, ionomers, cellulosic materials and the like.

Prior to the forming of the adhesive bond between the upper polyester film layer 50 and the adhesive 52 in order to laminate the layer 50 to the aluminum foil web 54, suitable imprinting is implemented. This printing as mentioned hereinbefore, is imparted to the lower surface 52 of the polyester film 50 in that indicia and legends, as mentioned hereinbefore, are applied through halftone color printing in suitable orientation such that upon adhesive securing or bonding thereof to the aluminum foil 54, the indicia will be viewable through the layer 50 from the top of the laminate 30 in the correctly represented orientation thereof, as may be the case in the above-mentioned U.S. Pat. No. 4,691,820.

As the laminated foil web 30 is advanced guided over the series of rollers 46 through 52 towards the printing head arrangement 34, the optical sensor unit 36 is adapted to scan and determine the location of at least one of the print fields 52a or 52b or 52c printed on the lower surface 52, so as to cause the printing head arrangement 34 to advance a ceramic printing head 34a into contact with the applicable printing fields 52a through 52c, and through the intermediary of thermal transfer printing, imprint appropriately variable and changeable printed data is imparted to the exterior surface of the polyester film 50. Such data; for example, when the laminate is severed into lid-forming labels for respective packages, may consist of suitable changeable lot numbers, expiration dates, and other physical data representative of the specific product housed in the package; for instance, data with regard to the power of a contact lens which is stored within a cavity of the package while immersed in a suitable protective sterilized saline solution.

Thus, the initial printing of the permanent indicia and legends which are provided on the lower surface 52 of the polyester film 50, which surface is adhesively bonded to the aluminum foil web 54, serves as a permanent display of the various generalized product-identifying and company-related information, advertising and logos or the like, while concurrently having at least one of the print fields serving as a register for imprinting by means of thermal transfer printing, other specific and variable product-related data onto the external surface of the foil laminate 30.

The foregoing thermal transfer printing is adapted to withstand temperatures in excess of 120° C. for periods of up to one-half hour, which temperatures may be encountered when the finished package and the product contained therein are subjected to sterilization under those conditions, without in any manner adversely affecting the quality and readability of the thermal transfer printing on the outer layer of the foil laminate 30. It is preferable to attain stable indicia by thermal transfer printing which indicia can withstand temperatures in the range of 1207 C. to 1307 C. over periods of about 30 minutes.

The foil laminate 30 may have its overall thickness within a range of approximately 0.07 to 0.08 mm, and may be supplied in suitable rolls of web lengths and sizes commensurate with the particular intended applications for the foil laminate.

From the foregoing, it becomes readily apparent to one of skill in the art that the utilization of the double-sided printing of the outer polyester film layer of the laminate provides advantages not attainable in the art, inasmuch as there is avoided the need for registration apertures and marks in the laminate, there is no necessity for employing laser printing, the latter of which does not always provide the appropriate printing quality, the elimination of the need for heat-stamp printing, which causes the forming of indentation in the foil laminate, thereby adversely affecting the proper heat sealing thereof with a plastic package containing the product. The present invention, in contrast therewith, provides a satisfactory printing on the external surface of laminate which is severed to form labels for the packages, which printing is resistant to abrasion and to obliteration caused by high temperatures being present over extensive periods of time, and which also provides for an adequate storage shelf-life for the completed package.

While there has been shown and described what is considered to be a preferred embodiment of the invention, it will, of course, be understood that various modifications and changes in form or detail could readily be made without departing from the spirit of the invention. It is, therefore, intended that the invention be not limited to the exact form than the whole of the invention herein disclosed as hereinafter claimed.

What is claimed is:

1. A method of printing on opposite surfaces of a layer from a multi-layered foil laminate, wherein said layer comprises a plastic film material, comprising either translucent or transparent material, having a first surface adhesively fastenable to a facing surface of a foil web; said method comprising the steps of:
    (a) imprinting a first indicia on said first surface of said plastic film material through lithographic printing;
    (b) adhesively fastening said imprinted first surface of said plastic film material layer to the facing surface of said foil web; and
    (c) imprinting second indicia on a second surface of said plastic film material remote from said foil web through thermal transfer printing;
    wherein said first indicia assists printing registration for determining the location of the second indicia.

2. A method of printing as claimed in claim 1, wherein said plastic film material is at least translucent, said lithographic printing step comprising printing said first indicia in at least one color on said first surface so as to render said first indicia visible in a desired orientation thereof upon viewing said second surface from the exterior of said laminate.

3. A method of printing as claimed in claim 2, wherein an opaque contrastingly colored background is printed on said first surface beneath said first indicia.

4. A method of printing as claimed in claim 1, wherein said thermal transfer printing step on said second surface of the plastic film material has the second indicia remaining stable upon being exposed to temperatures within the range of about 120° C. to 130° C. over periods of about 30 minutes.

5. A method of printing as claimed in claim 1, wherein said plastic film material layer is constituted of polyester.

6. A method of printing as claimed in claim 5, wherein said foil web is constituted of aluminum.

7. A method of printing as claimed in claim 1, wherein said plastic film material is adhesively secured to said foil web through the interposition of a layer consisting of a dry bond adhesive.

8. A method of printing as claimed in claim 7, wherein said dry bond adhesive comprises a polyurethane adhesive.

9. A method of printing as claimed in claim 1, wherein a surface of said foil web opposite the surface to which said plastic film material is adhered has applied thereto in superposition:

(a) a layer of a dry bond adhesive coated on said foil web; and (b) a further layer comprising a plastic film material positioned on said dry bond adhesive.

10. A method of printing as claimed in claim 9, wherein said dry bond adhesive comprises a polyurethane adhesive.

11. A method of printing as claimed in claim 9, wherein said further plastic film material is constituted of oriented polypropylene.

12. A method of printing as claimed in claim 1, wherein said thermal transfer printing step is implemented by a ceramic print head contacting the second surface of said plastic film material.

13. A method of printing as claimed in claim 12, wherein the second surface of said plastic film material is an outer exposed surface of said foil laminate enabling external viewing of the indicia printed on both surfaces thereof.

14. A method of printing as claimed in claim 1, wherein said printing registration is controlled by at lest one optical sensor scanning at least one print field of said first indicia.

15. A method of printing as claimed in claim 13, wherein said second indicia imparted by thermal transfer printing to the second surface of said plastic film material are located in specified orientations over print fields present on the first surface of said plastic film material.

16. A method of printing as claimed in claim 9, wherein said foil laminate has an overall thickness of about 0.07 to 0.08 mm.

* * * * *